United States Patent [19]

Houlton

[11] 4,397,151
[45] Aug. 9, 1983

[54] HEAT ENGINE

[76] Inventor: Samuel S. Houlton, 616 G St., Apartment 23, Chula Vista, Calif. 92010

[21] Appl. No.: 360,884

[22] Filed: Mar. 22, 1982

[51] Int. Cl.³ .............................................. F03G 7/06
[52] U.S. Cl. ...................................................... 60/527
[58] Field of Search .................................. 60/527, 529

[56] References Cited

U.S. PATENT DOCUMENTS 3,229,177  1/1966  Clarke .................................. 60/527
3,291,474  12/1966  Clarke .................................. 60/529
4,055,955  11/1977  Johnson .............................. 60/527

Primary Examiner—Allen M. Ostrager
Assistant Examiner—Peggy A. Loiacano

Attorney, Agent, or Firm—Thomas J. Tighe

[57] ABSTRACT

A pair of spooling means, such as cylinders, are rotatable about fixed and parallel axes. An elongated member with a planar surface moves in reciprocating motion essentially normal to the cylinder axes such that planar surface remains adjacent and essentially tangential to the cylinder walls. Nitinol bands annealed as straight lengths are fixed at their ends to the cylinder walls and the planar surface such that a portion of the bands become spooled or unspooled about each cylinder depending on the motion and position of elongated member. The motion of the elongated member is caused by application of heat energy to spooled cylinder causing its bands to stiffen and become straight and withdrawal of heat energy from unspooled cylinder causing its bands to become bendable.

7 Claims, 4 Drawing Figures

HEAT ENGINE

BACKGROUND OF THE INVENTION

This invention relates to Heat Engines in general and more specifically to engines utilizing the shape memory properties of alloys.

Thermally-related shape memory properties of certain nickel-titanium alloys are well known. Such properties were first observed in the 1960's and since their discovery, they have been applied to thermal-mechanical energy conversion systems, such as the one presented in U.S. Pat. No. 3,403,238 by W. J. Buehler et. al. The name nitinol has been generally applied to such alloys. Nitinol is derived from the combination of the first two letters of nickel "ni", the first two letters of titanium "ti", and the letters "nol" from the U.S. Naval Ordiance Laboratory where its properties were first discovered.

Although the shape memory characteristics of nitinol are well known, a brief description is in order. Nitinol, when annealed into a particular shape, will tend to return to that shape when heated above a certain transition temperature. In returning to that shape the nitinol can release forces as great as 55 tons per square inch, and the force of the change occurs uniformly throughout the nitinol element. If cooled below a second transition temperature, the nitinol becomes malleable, that is, bendable with very little resistance.

Although, the reasons why nitinol exhibits such properties are still being investigated, the most common thought is that when the material is annealed, it forms a cubic atomic structure, and when the material is cooled below a certain transition temperature, a martensitic transformation takes place and the nitinol shifts from an initial cubic structure to a complex rhombic structure, making it malleable. When heated above a second entirely different transition temperature, the reverse transformation takes place, from rhombic to cubic, and the material will return to its original shape.

The temperature differential between the upper transformation point when the material returns to its original shape and the lower transformation temperature when the material becomes extremely malleable, is commonly referred to as the temperature gradient. If the nitinol is composed of 55% nickel and 45% titanium, the material will give its shape memory response at a temperature gradient within room temperature range. Slight increases in the proportion of titanium cause the temperature gradient to shift upward such that the material will perform its shape memory response at temperatures as high as 120° centigrade. Studies have revealed that temperature gradients of as little as 9° centigrade can cause the shape memory transformation. Other studies have shown that the transformation can be repeated almost ad infintum with little or no deterioation in nitinol elements after tens of millions of cycles.

The use of nitinol in heat engines is most advantageous because low temperature thermal energy across a small temperature gradient can be used to perform mechanical work. The sources of low grade heat are widespread, such as: geothermal energy, oceantic thermal gradient energy, and most notably, solar thermal energy. The invention presented herein has the advantage in that it can utilize any convenient source of thermal energy for its operation. In other words, the thermal energy delivered to the nitinol elements of this invention can be delivered by sunlight or heated fluids such as air.

Other advantages and attributes of this invention will be apparent upon a review of the drawings and a reading of the text hereinafter.

SUMMARY

This invention presents a first and a second cylinder of equal diameter, both cylinders being rotatable about fixed, parallel axes. The axes are suitably spaced apart. An elongated member having a longitudinal planar surface is disposed such that the planar surface is essentially tangential to the cylinder walls. A plurality of nitinol bands, annealed as straight lengths, are fixed in parallel fashion at their ends to the first cylinder wall and one end of the planar surface. An equal number of nitinol bands, likewise annealed, are fixed in parallel fashion at their ends to the second cylinder wall and the other end of the planar surface. A runner means is used to guide the elongated member such that the planar surface travels a limited distance in either a forward or backward direction in a plane essentially tangential to the cylinder walls. At a first limit of travel, the nitinol bands fixed to the first cylinder are "spooled" about said cylinder, and the nitinol bands fixed to the second cylinder are "unspooled" or substantially straight. At a second and opposite limit of travel the nitinol bands fixed to the first cylinder are substantially "unspooled" and the bands fixed to the second cylinder are "spooled" about the second cylinder. A heat source and a means for directing heat alternately to the nitinol bands of either cylinder are described herein but are not claimed as part of this invention. The term "spooled" describes the state of the nitinol bands of a cylinder being wound about that cylinder as thread is wound about a spool. The term "unspooled" describes the state of the nitinol bands of a cylinder being unwound from about the cylinder, that is, in an essentially straight condition.

It is an object of this invention to create a heat engine with a reciprocating member as a driving rod for performing mechanical work.

It is a further object of this invention to create a heat engine able to utilize low-grade heat gradients to perform useful work.

It is a third object of this invention to utilize the unique properties of nitinol to create a heat engine capable of utilizing low-grade heat gradients to perform useful work.

Other objects of this invention will be apparent from a reading of the text hereinafter.

DESCRIPTION OF THE PREFERRED EMBODIMENT

Figure 1:
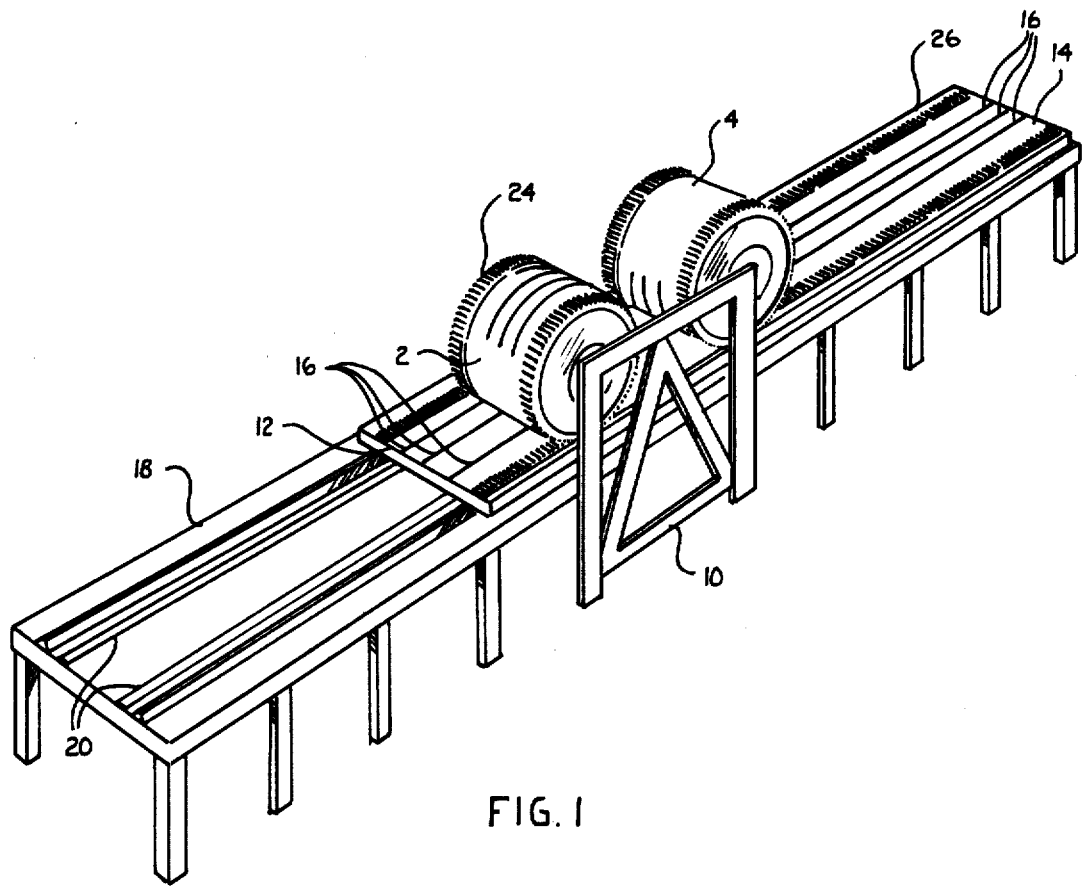
FIG. 1 is a perspective view of the basic elements of the invention.
Figure 2:
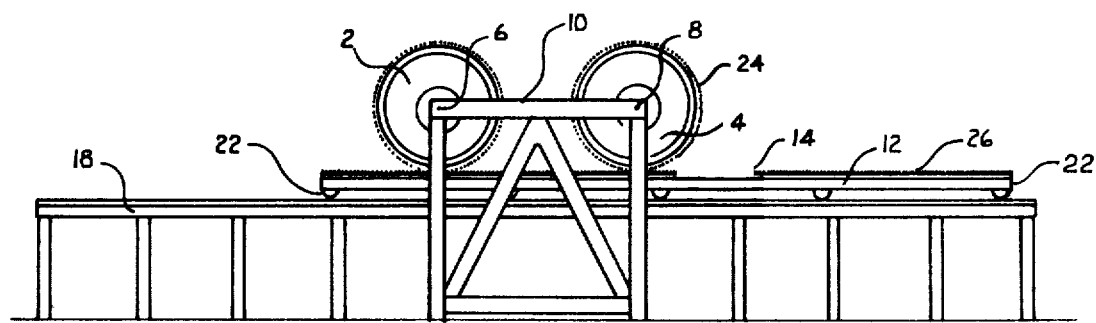
FIG. 2 is a side view of the invention of FIG. 1.

Referring to FIGS. 1 and 2, a first spooling means 2 and a second spooling means 4 are shown as cylinders rotatable about a first axle 6 and a second axle 8, respectively. An axle fixing frame 10 is used to prevent any linear movement of the axles 6 and 8 and to align them parallel fashion. An elongated member 12 with a longitudinal planar surface 14 is disposed such that the planar surface 14 is essentially tangential to the walls of the cylinders 2 and 4. Movement of the elongated member 12 is limited to reciprocating motion along the member's longitudinal axis by a runner means comprising guide rails 20 and bearing means 22, the guide rails 20 and bearing means 22 being interlocked and supported by a support platform 18. Three nitinol bands 16 are each shown fixed at one end to the wall of the first cylinder 2 and fixed at the other end to the planar surface 14 at the end of the planar surface closest to the first cylinder. Three nitinol bands 16 are also each shown fixed at one end to the wall of the second cylinder 4 and also fixed to the end of the planar surface 14 nearest the second cylinder 4. The ends of the cylinders 2 and 4 form circular gears 24 which mesh with two gear tracks 26 disposed along the longitudinal margins of the planar surface 14.

Referring again to FIGS. 1 and 2, the first cylinder 2 is shown in the spooled condition, that is, the nitinol bands associated with it are wound about the wall of the cylinder 2. The second cylinder 4 is shown in the unspooled condition, that is, the nitinol bands associated with it are unwound from about the second cylinder and are essentially straight.

In operation, heat energy from a heat source (not shown) is alternately applied to the cylinders. The term "alternately applied" refers to directing all of the heat to one cylinder for a suitable period of time and then directing all of the heat to the other cylinder for substantially the same period of time. As heat is applied to one cylinder, the other cylinder and its nitinol bands are either actively or passively cooled by means of radiation, convection, or conduction.

The method of converting heat energy to mechanical energy in this invention requires that the heat energy be applied to each cylinder when its nitinol bands are substantially spooled about the cylinder. This results in the heating of the spooled bands. The heat energy is applied for a period of time sufficient to heat the nitinol bands beyond their upper transformation temperature which causes the bands to straighten because they were annealed as straight lengths. As the nitinol bands straighten, they unspool themselves from the cylinder causing the cylinder to rotate. The rotation of the unspooling cylinder, in turn, causes the elongated member to move in the direction of the unspooling cylinder. The motion of the elongated member toward the unspooling cylinder causes the other cylinder to spool its nitinol bands. If the bands of the spooling cylinder have been cooled below their lower transformation temperature, then the member meets very little resistance. At, or a suitable time just prior to, the time when the unspooling cylinder has unspooled to its limit, heat is re-directed to the then spooled or substantially spooled cylinder, and the bands of the then unspooled cylinder are passively or actively cooled. When the bands of the newly spooled cylinder are heated beyond their upper transformation temperature, the reverse operation takes place and the member is moved in a direction opposite of the firstly-described motion. Thus by application of heat energy to spooled bands and the withdrawal of heat energy from unspooled bands, the member is made to move in reciprocating motion. The elongated member then can be used as a driving rod to perform mechanical work.

For most efficient operation, the rate at which heat energy is applied to the spooled bands should be substantially equal to the rate at which the heat energy is removed from the unspooled bands. If equality of the rates is essentially achieved, then for each cycle of operation, the spooled bands will reach their upper transformation temperature at about the same time that the unspooled bands will reach their lower transformation temperature. Such timing will minimize the possibility of the two sets of bands opposing each other.

Figure 3:
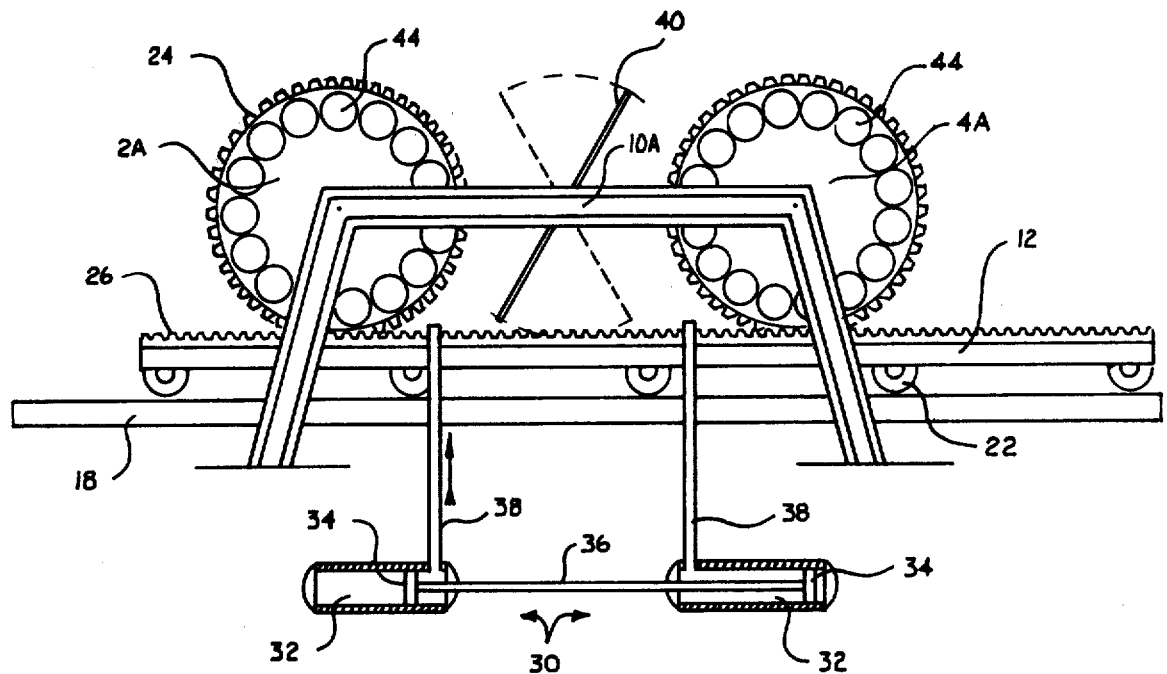
FIG. 3 is a side view of the invention utilizing hot fluid as the heat source and utilizing cooling ducts in the cylinders.
Figure 4:
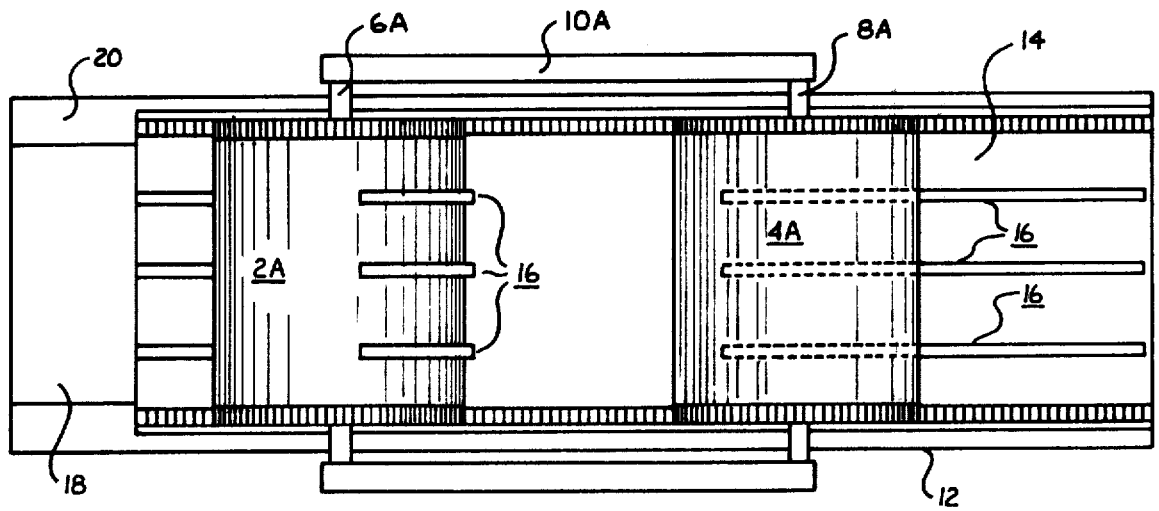
FIG. 4 is a plan view of the invention of FIG. 3.

Referring to FIGS. 3 and 4, a first spooling means 2A and a second spooling means 4A are shown rotatable about a first axle 6A and a second axle 8A, respectively. The ends of the spooling means 2A and 4A form cooling appertures 44 for more rapid cooling of said means. An axle fixing means 10A is used to prevent linear movement of the axle 6A and 8A and to align them in parallel fashion. The elements bearing the same numeral designators as elements in FIGS. 1 and 2 are identical to those former elements.

Referring again to FIGS. 3 and 4 and by way of example, a hot fluid pump generally designated 30 is shown as a source of alternately applied heat energy. The hot fluid pump 30 comprises a pair of chambers 32 which are fed hot fluid from a source of heated fluid (not shown). The chambers 32 are alternately evacuated by a pair of pistons 34 connected by a connecting rod 36. Each of the chambers 32 are operative to heat only one of the cylinders 2A or 4A by means of a pair of conduit 38. In operation, the chambers 32 and the conduits 38 are stationary but the pistons 34 move in coordination with the elongated member 12. It can be seen that as the first cylinder 2A is being spooled, the chamber 32 associated with the first cylinder 2A is being evacuated of hot fluid and the chamber associated with the second cylinder 4A is being filled with hot fluid. It can also be seen that the reverse process takes place when the elongated member 12 is moving in the opposite direction and the second cylinder 4A is being spooled. Preferably, a pair of conventional valves (not shown), one for each conduit, would alternately permit and prevent any fluid communication from a chamber to its conduit in coordination with the evacuation and filling of said chamber by heated fluid.

Referring again to FIG. 3, a mirrored deflector 40 is shown by way of an example of how light energy could be alternately applied to the spooling means. Assuming a source of overhead light (not shown), the deflector 40 is shown to be in a position where it deflects the light energy onto the spooled first cylinder 2A. The position of the deflector when the second cylinder 4A is spooled is shown by the dashed line. The deflector 40 can be any suitable combination of a lense for concentrating the light energy and a mirrored surface for directing said energy.

Referring to all Figures, the geared portions of the spooling means and the longitudinally oriented gear tracks of the elongated members are used to assist the unspooling spooling means in moving their respective members thereby relieving some of the stresses placed upon the fixing points between the nitinol bands and the members. The addition of more nitinol bands may be installed as required for more thrust or power.

The foregoing descriptions were given for illustration purposes only and no unnecessary limitations in the claims should be drawn therefrom.

I claim:

1. In a heat engine with a source of heat energy and a means for alternately applying said heat energy for suitable periods of time, the improvement comprising:
   (a) a first spooling means rotatable about a fixed axis,
   (b) a second spooling means rotatable about a fixed axis, the axis of the second spooling means being substantially parallel to the axis of the first spooling means,
   (c) an elongated member disposed essentially tangential to both spooling means with said member's longitudinal axis being substantially normal to the axes of the first and second spooling means, said member being operable to move a suitably limited distance along its longitudinal axis in a first direction and in a second and opposite direction,
   (d) a first plurality of nitinol bands annealed as straight lengths and each being suitably fixed at one end to the first spooling means and at the other end to the elongated member such that when said member is moved in the first direction, said bands are spooled about said spooling means and when said member is moved in the second direction, said bands are unspooled from about said spooling means, and
   (e) a second plurality of nitinol bands annealed as straight lengths and each being suitably fixed at one end to the second spooling means and at the other end to the elongated member such that when said member is moved in the second direction said bands are spooled about said spooling means and when said member is moved in the first direction, said bands are unspooled from about said spooling means, the heat energy being alternately applied to the first and second plurality of nitinol bands to cause operation of the engine.

2. The heat engine of claim 1 wherein the first and second spooling means comprises a pair of cylinders of substantially equal diameter and the first and second plurality of nitinol bands are equal in number.

3. The heat engine of claim 1 or 2 wherein a runner means is used to guide the motion of the elongated member such that the planar surface remains in a plane essentially tangential to the first and second spooling means.

4. The heat engine of claim 3 wherein the elongated member comprises a generally rectangular platform and wherein the runner means comprises a guide rail means and a bearing means.

5. The heat engine of claim 1 or 2 wherein a portion of each of said spooling means forms at least one gear means and wherein the planar surface of the elongated member has at least one longitudinally oriented gear track thereon, said gear means and gear track being aligned so as to mesh.

6. The heat engine of claim 4 wherein a portion of each of said spooling means forms at least one gear means and wherein the planar surface of the elongated member has at least one longitudinally oriented gear track thereon, said gear means and gear track being aligned so as to mesh.

7. The heat engine of claim 1 or 2 wherein the nitinol bands comprise substantially 55% nickel and 45% titanium.

* * * * *